(12) United States Patent
Enders

(10) Patent No.: US 7,261,318 B2
(45) Date of Patent: Aug. 28, 2007

(54) KNEE AIRBAG AND GLOVE BOX ASSEMBLY

(75) Inventor: Mark L. Enders, Pleasant View, UT (US)

(73) Assignee: Autoliv ASP, Inc., Ogden, UT (US)

( * ) Notice: Subject to any disclaimer, the term of this patent is extended or adjusted under 35 U.S.C. 154(b) by 423 days.

(21) Appl. No.: 10/725,280

(22) Filed: Dec. 1, 2003

(65) Prior Publication Data
US 2005/0116449 A1    Jun. 2, 2005

(51) Int. Cl.
*B60R 21/16* (2006.01)
(52) U.S. Cl. .................... 280/732; 280/752
(58) Field of Classification Search .......... 280/728.3, 280/729, 730.1, 732, 743.1, 752, 743.2; *B60R 21/45*
See application file for complete search history.

(56) References Cited

U.S. PATENT DOCUMENTS

| | | | |
|---|---|---|---|
| 2,834,606 A | 5/1958 | Bertrand | |
| 3,610,657 A | 10/1971 | Cole | |
| 3,618,978 A | 11/1971 | Klove, Jr. et al. | |
| 3,642,303 A | 2/1972 | Irish et al. | |
| 3,702,706 A | 11/1972 | Sobkow | |
| 3,767,225 A | 10/1973 | Mazelsky | |
| 3,768,830 A | 10/1973 | Hass | |
| 3,784,223 A | 1/1974 | Hass et al. | |
| 3,807,754 A | 4/1974 | Rodenbach et al. | |
| 4,427,215 A | 1/1984 | Weichenrieder et al. | |
| 4,893,834 A | 1/1990 | Honda et al. | |
| 5,071,162 A | 12/1991 | Takagawa | |
| 5,190,314 A | 3/1993 | Takasugi | |
| 5,275,456 A | 1/1994 | Ishii et al. | |
| 5,312,131 A | 5/1994 | Kitagawa et al. | |
| 5,344,184 A | 9/1994 | Keeler et al. | |
| 5,370,417 A | 12/1994 | Kelman et al. | |
| 5,413,379 A | 5/1995 | Koma | |
| 5,443,285 A | 8/1995 | Boll | |

(Continued)

FOREIGN PATENT DOCUMENTS

DE    42 09 604    10/1992

(Continued)

*Primary Examiner*—Eric Culbreth
*Assistant Examiner*—Barry Gooden, Jr.
(74) *Attorney, Agent, or Firm*—Sally J Brown; Madson & Austin

(57) ABSTRACT

A glove box airbag system is disclosed that may be used to protect the knees and/or legs of a vehicle occupant during a crash. The airbag assembly includes a glove box and a housing that encases a knee airbag. The housing is positioned below the glove box. The entirety of the housing may be positioned below the entirety of the glove box. The airbag assembly also has a front member that covers the glove box and the housing. The front member may include a glove box door that covers the glove box and an airbag door that covers the housing. Alternatively, the front member may be a glove box door that covers both the housing and the glove box. Further, the front member may include a glove box door that covers the glove box and an aperture that is positioned in front of the housing. A hinge and/or a latch mechanism that allow the glove box door to move between a closed position and an open position may also be added.

31 Claims, 11 Drawing Sheets

U.S. PATENT DOCUMENTS

| | | |
|---|---|---|
| 5,536,043 A | 7/1996 | Lang et al. |
| 5,570,901 A | 11/1996 | Fyrainer |
| 5,639,113 A | 6/1997 | Goss et al. |
| 5,718,453 A | 2/1998 | Kassel et al. |
| 5,762,359 A | 6/1998 | Webber et al. |
| 5,775,729 A | 7/1998 | Schneider et al. |
| 5,868,422 A | 2/1999 | Galbraith et al. |
| 5,876,061 A | 3/1999 | Stavermann |
| 5,924,831 A | 7/1999 | Ricks et al. |
| 5,931,493 A | 8/1999 | Sutherland |
| 6,029,992 A | 2/2000 | Vendely et al. |
| 6,039,380 A | 3/2000 | Heilig et al. |
| 6,092,832 A | 7/2000 | Worrell et al. |
| 6,092,836 A * | 7/2000 | Saslecov .................. 280/730.1 |
| 6,149,194 A | 11/2000 | Breed et al. |
| 6,193,272 B1 | 2/2001 | Aigner et al. |
| 6,196,573 B1 | 3/2001 | Worrell et al. |
| 6,217,059 B1 | 4/2001 | Brown et al. |
| 6,276,713 B1 * | 8/2001 | Duletzke .................... 280/732 |
| 6,302,437 B1 * | 10/2001 | Marriott et al. ............. 280/732 |
| 6,336,653 B1 | 1/2002 | Yaniv et al. |
| 6,345,837 B1 * | 2/2002 | Warnez et al. ........... 280/728.3 |
| 6,536,802 B1 * | 3/2003 | Sutherland et al. ......... 280/752 |
| 6,817,627 B2 * | 11/2004 | Galmiche et al. ........ 280/730.1 |
| 2003/0030253 A1 | 2/2003 | Galmiche et al. |
| 2004/0124617 A1 * | 7/2004 | Morita ...................... 280/732 |

FOREIGN PATENT DOCUMENTS

| | | |
|---|---|---|
| GB | 2 357 466 | 6/2001 |
| JP | 2002-347565 A | 12/2002 |

* cited by examiner

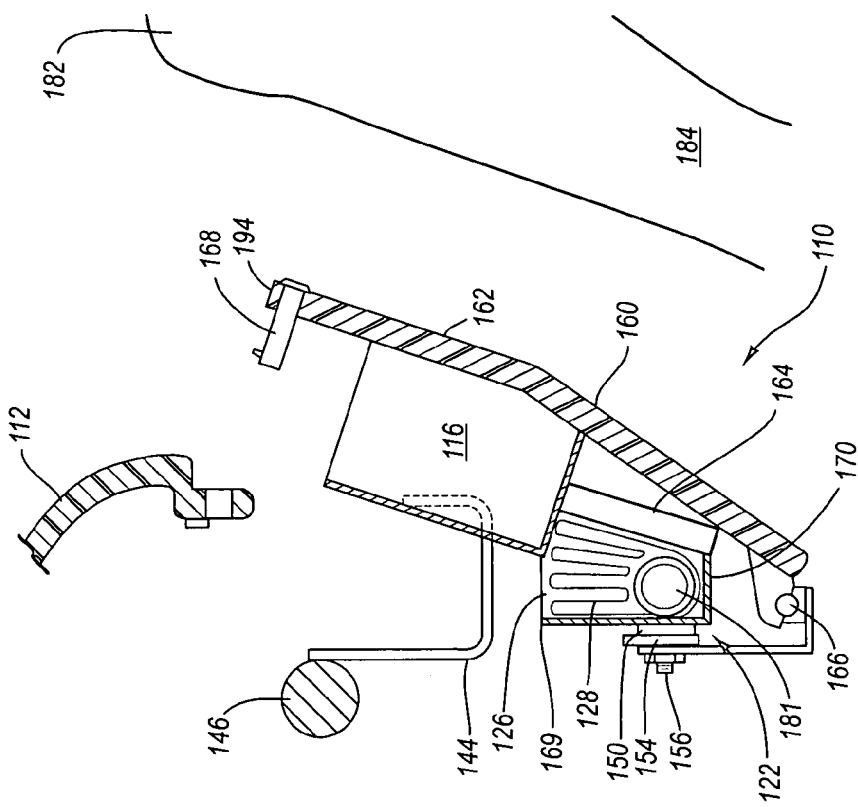
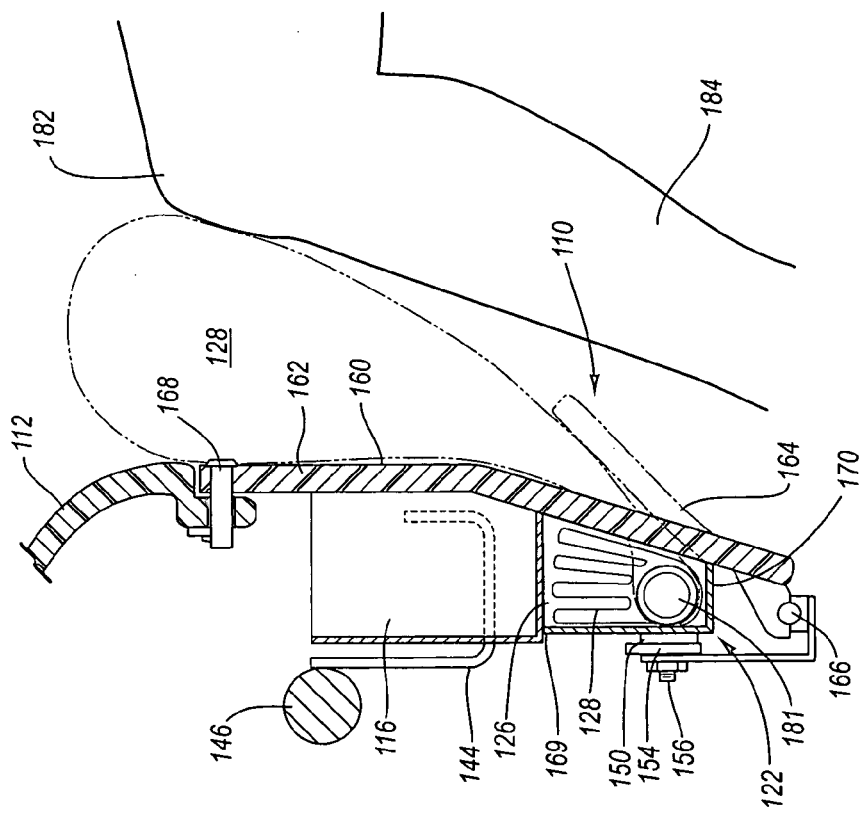

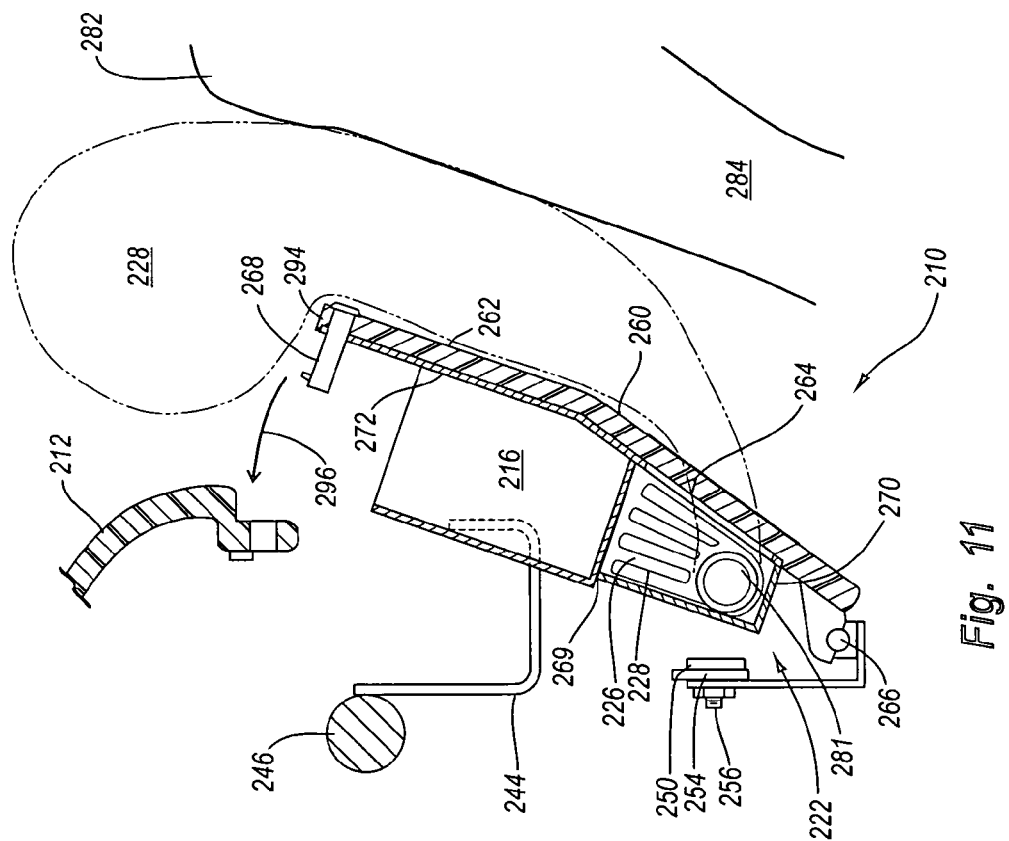
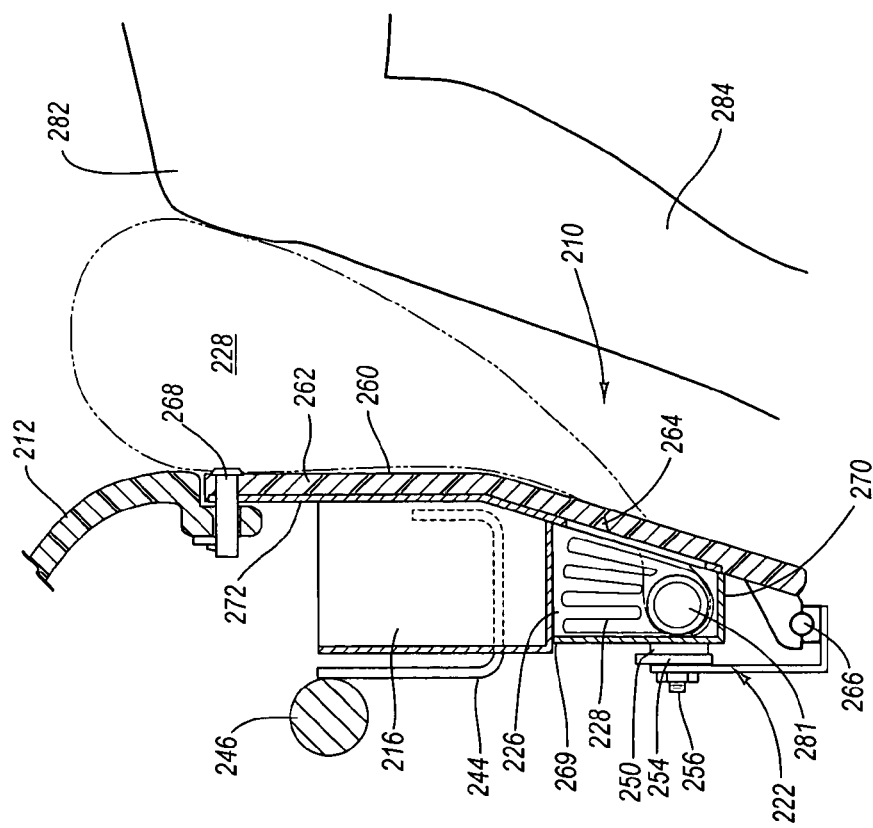

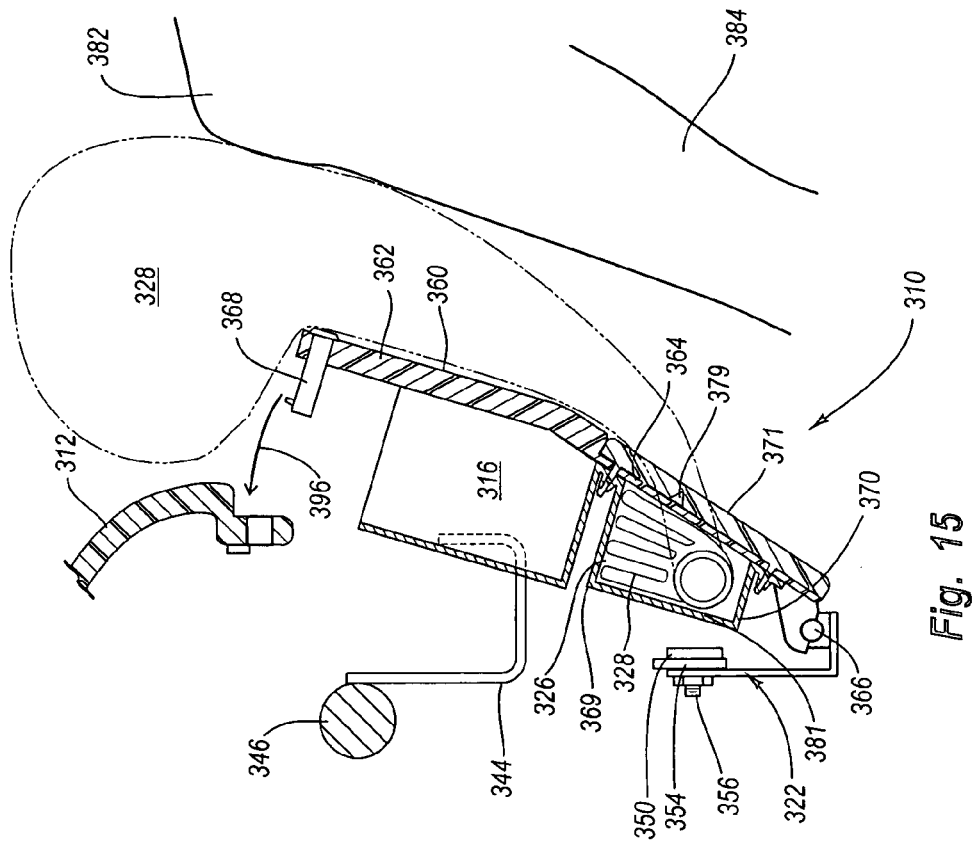
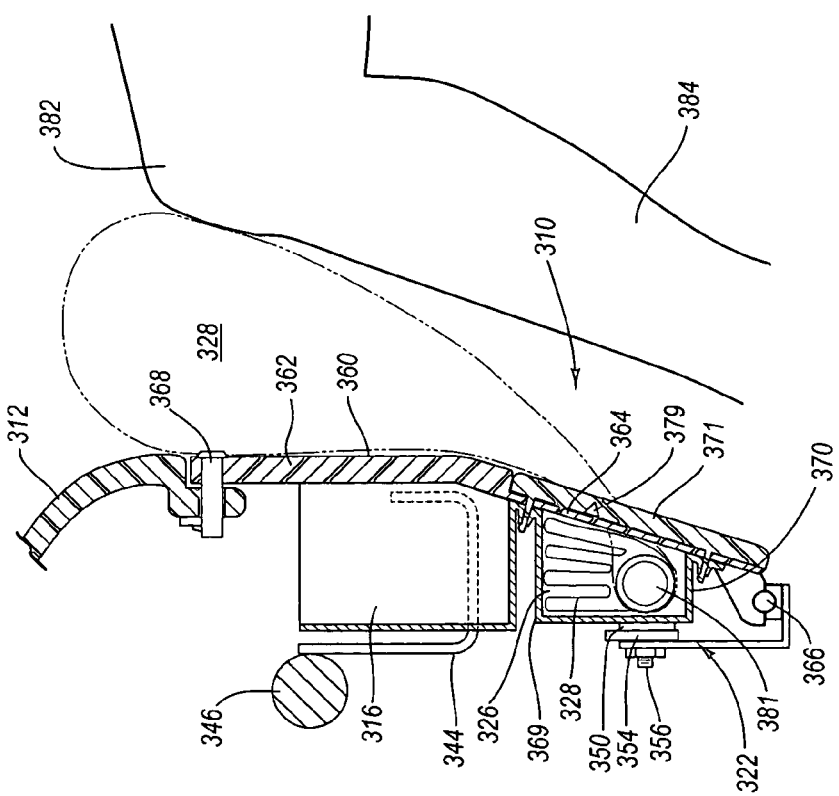

KNEE AIRBAG AND GLOVE BOX ASSEMBLY

BACKGROUND OF THE INVENTION

1. Field of the Invention

The present invention relates to knee airbag assemblies. More specifically, the present invention relates to a novel knee airbag and glove box assembly that may be installed onto the front passenger side of a motor vehicle.

2. Description of Related Art

Inflatable airbags are well accepted for use in motor vehicles and have been credited with preventing numerous deaths and accidents. Some statistics estimate that frontal airbags reduce the fatalities in head-on collisions by 25% among drivers using seat belts and by more than 30% among unbelted drivers. Statistics further suggest that with use of a combination of seat belt and airbag, serious chest injuries in frontal collisions can be reduced by 65% and serious head injuries by up to 75%. Airbag use presents clear benefits and vehicle owners are frequently willing to pay the added expense for airbags.

A modern airbag apparatus may include an electronic control unit ("ECU") and one or more airbag modules. The ECU is usually installed in the middle of an automobile, between the passenger and engine compartments. The ECU includes a sensor that continuously monitors the acceleration and deceleration of the vehicle and sends this information to a processor that processes an algorithm to determine if the vehicle is in an accident situation.

When the processor determines that there is an accident situation, the ECU transmits an electrical current to an initiator in the airbag module. The initiator triggers operation of the inflator or gas generator which, in some embodiments, uses a combination of compressed gas and solid fuel. The inflator inflates a textile airbag to project towards the passenger and prevent injury to the passenger. In some airbag apparatuses, the airbag may be fully inflated within 50 thousandths of a second and deflated within two tenths of a second.

Airbag apparatuses have been designed for deployment in front of the torso of an occupant between the upper torso of an occupant and the windshield or instrument panel. Such airbags are referred to as "primary airbags" and usually consist of driver's airbags mounted in or proximate the steering wheel and/or passenger airbags mounted in the dashboard. Primary airbags protect the occupant's upper torso and head from colliding with a windshield or instrument panel during a crash.

Primary airbags are generally designed under the assumption that the occupant is riding in the vehicle in a forward facing, seated position with both feet on the vehicle floor. When an occupant is not in this position, the occupant or occupant's body part is said to be "out of position." As an occupant occasionally is "out of position," airbag apparatuses that effectively restrain the occupant regardless of the occupant's position are advantageous.

During a front-end collision, if the occupant is restrained by a seat belt, the occupant's upper torso bends at the waist and hits the primary airbag. However, depending on the design of the vehicle seat and force of the collision, there is a tendency for an occupant to slide forward along the seat and slip below the primary airbag, falling to the feet and leg compartment of the vehicle. Such non-preferred movement of the vehicle occupant towards the feet and leg compartments of the vehicle is often referred to as "submarining."

Alternatively, there is also a tendency for the legs and knees of the occupant to slide or shift to one side of the seat or the other during a front-end collision. The tendency is pronounced when the occupant is not properly restrained by a seat belt. This tendency may be referred to as "sliding". Sliding often causes the occupant's upper torso to bend at the waist but not in a direction perpendicular to the primary airbag. When the occupant slides, the primary airbag is less effective in protecting the occupant.

Sliding and submarining are more prevalent in vehicles that have large legroom compartments. On the other hand, vehicles that have restricted legroom, such as compact models or sports cars, have a lower tendency for sliding and submarining. In these smaller cars, the distance between the legs and knees of the occupant and the instrument panel is shorter than the distance in vehicles like sport utility vehicles or trucks. Thus, if a compact model or sports car is involved in an accident, the occupant's knees will likely strike a portion of the instrument panel. In turn, this contact with the instrument panel prevents the occupant from sliding or submarining. However, the material of the car's instrument panel has limited energy absorption characteristics and can cause injury to the occupant's lower legs. The area of the instrument panel that is impacted by the occupant's knees is sometimes referred to as the knee bolster.

In order to prevent sliding and lower leg injuries in vehicles, knee airbag systems have been developed. A knee airbag system is generally positioned in the lower portion of the instrument panel. Knee airbag systems allow vehicle manufacturers to design vehicles with more legroom and still have safety comparable to that of vehicles with less legroom.

As with other types of airbags, knee airbags include an inflator and an airbag. In general, the airbag is made of a flexible fabric material such as a weave of nylon and/or polyester. Generally, multiple pieces of fabric are sewn together to form an airbag. Alternatively, the material may be woven to create a one piece airbag. Most knee airbag systems will also include a housing. The housing is a conventional enclosure for securing the knee airbag components to the vehicle. The housing stores the knee airbag system components while the airbag is deflated and not in use.

Knee airbag systems are designed such that if the ECU senses or detects a crash or accident, the ECU will initiate and/or activate the inflator. This activation of the inflator causes the inflator to produce and/or channel a large volume of inflation gas into the airbag. In turn, this influx of inflation gas causes the airbag to inflate and deploy into the interior of the vehicle.

When the knee airbag is inflated during the crash, the airbag becomes positioned between the knees and/or legs of the occupant. Accordingly, as the occupant begins to move towards the instrument panel of the vehicle during a crash, the knees and/or legs of the occupant will contact and/or impact the inflated knee airbag. Such contact with the knee airbag holds the vehicle occupant in the desired position and prevents the occupant from sliding or submarining during a crash.

Many of the known knee airbag systems have been specifically designed such that they may be installed onto the driver side of the instrument panel. Such driver-side knee airbags are typically positioned below the steering wheel and are designed to protect the vehicle's driver during an accident. Experience has shown however that it is much more difficult to create a knee airbag system that may be installed onto the vehicle's passenger side. The reason for this is that most vehicles contain a glove box that is located on the passenger side of the instrument panel. This placement of the glove box overlaps and/or occupies all or a portion of the space needed to install the knee airbag system. Therefore, in order to accommodate the spatial constraints caused by the glove box, many passenger-side knee airbag systems must be installed onto the vehicle in a position that does not provide optimal impact protection to the a vehicle occupant seated in the front passenger seat.

Additionally, the spatial constraints caused by the glove box also raise the costs associated with installing the knee airbag system into the vehicle. Specifically, because the glove box overlaps with the knee airbag system, experienced and/or skilled laborers will often be required to use extra seconds during to installation process to ensure that the knee airbag system does not interfere with the ability to open and close the glove box door. As the airbag and vehicle manufacturer incur costs for every moment that passes during the installation process, these extra moments spent during installation will raise the production costs and can drastically affect the manufacturer's overall profit margin.

Accordingly, there is a need in the art for a novel knee airbag and glove box assembly that addresses and/or solves one or more of the above-listed problems. Such a system and device is disclosed herein.

SUMMARY OF THE INVENTION

The apparatus of the present invention has been developed in response to the present state of the art, and in particular, in response to the problems and needs in the art that have not yet been fully solved by currently available glove box airbag systems. In general, the present invention comprises an airbag assembly that includes a glove box. The glove box is made of metal, plastic, and other similar materials and is designed such that it may be used to store equipment, papers, booklets, and the like. The glove box is further designed such that it may be attached or positioned onto a vehicle's instrument panel. The airbag assembly also comprises a housing that encases a knee airbag. The housing may be separate from the glove box. However, other embodiments may also be made in which the housing is attached to and/or integral with the glove box.

The housing is constructed such that it may likewise be attached to a vehicle's instrument panel. Preferably, the housing is positioned below the glove box. In some embodiments, this may be accomplished by constructing the airbag assembly such that the entirety of the housing is positioned below the entirety of the glove box. However, other embodiments may also be made in which only a portion of the housing is positioned below the glove box.

The airbag assembly further comprises a front member that is positioned forward of the glove box. The front member is designed such that it covers both the glove box and the housing. In some embodiments, the front member may comprise a glove box door that covers the glove box and an airbag door that covers the housing. Yet further embodiments may be made in which the front member comprises a glove box door that covers both the glove box and the housing. Still further embodiments may be constructed in which the front member comprises a glove box door that is positioned in front of the glove box and an aperture that is positioned in front of the housing.

A hinge and a latch mechanism may additionally be added to the airbag assembly. The latch mechanism is designed to selectively engage and disengage a top portion of the instrument panel. Preferably, the hinge and the latch mechanism are designed such that if the latch mechanism disengages from the top portion, the glove box door may be moved into an open position.

In some embodiments, the hinge is attached to a top edge of the housing. As a result, when the glove box door is moved into the open position, the housing does not move. However, other embodiments may also be made in which the hinge is positioned below the housing. In such embodiments, the airbag assembly is designed such that the housing will move when the glove box door is moved into the open position.

The airbag assembly may further be designed such that if the glove box door is in the open position, the glove box door does not block or hinder the deployment of the knee airbag. In such embodiments, the airbag assembly may deploy the knee airbag into an inflated configuration during a crash regardless of whether the glove box door is in an open position or a closed position. Yet further embodiments may also be constructed such that if the glove box door is in the open position during a crash, the deployment of the airbag will push and/or move the glove box door into a closed position.

In some embodiments, the airbag assembly may further comprise a middle panel that is made of metal, plastic, rubber, polyvinyl, and/or other similar materials. The middle panel is positioned inside of the front member. More specifically, the airbag assembly is constructed such that the middle panel is positioned between the front member and the glove box and/or housing. Preferably, the middle panel is held between the front member and the glove box and/or housing by having the front member include one or more extending tabs that pass through one or more slots on the middle panel.

In further embodiments, the airbag assembly may additionally comprise a cover that is made of a thermoplastic elastomeric material. The cover is preferably sized and configured such that it may cover an aperture in the front member. The cover is preferably attached to the housing and the front member via one or more flanges that pass through one or more holes in the front member. Additionally, the flanges may also be in contact with one or more engaging tanges that are positioned on the housing.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 6 is a side cross-sectional view of the airbag assembly of FIG. 5 in which the glove box door is shown in a closed position;

FIG. 7 is a side cross-sectional view of the airbag assembly of FIG. 5 in which the glove box door is shown in an open position;

FIG. 10 is a side cross-sectional view of the airbag assembly of FIG. 8 in which the glove box door is shown in a closed position;

FIG. 11 is a side cross-sectional view of the airbag assembly of FIG. 8 in which the glove box door is shown in an open position;

FIG. 14 is a side cross-sectional view of the airbag assembly of FIG. 12 in which the glove box door is shown in a closed position; and FIG. 15 is a side cross-sectional view of the airbag assembly of FIG. 12 in which the glove box door is shown in an open position.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 15, is not intended to limit the scope of the invention, as claimed, but is merely representative of presently preferred embodiments of the invention.

Figure 1:
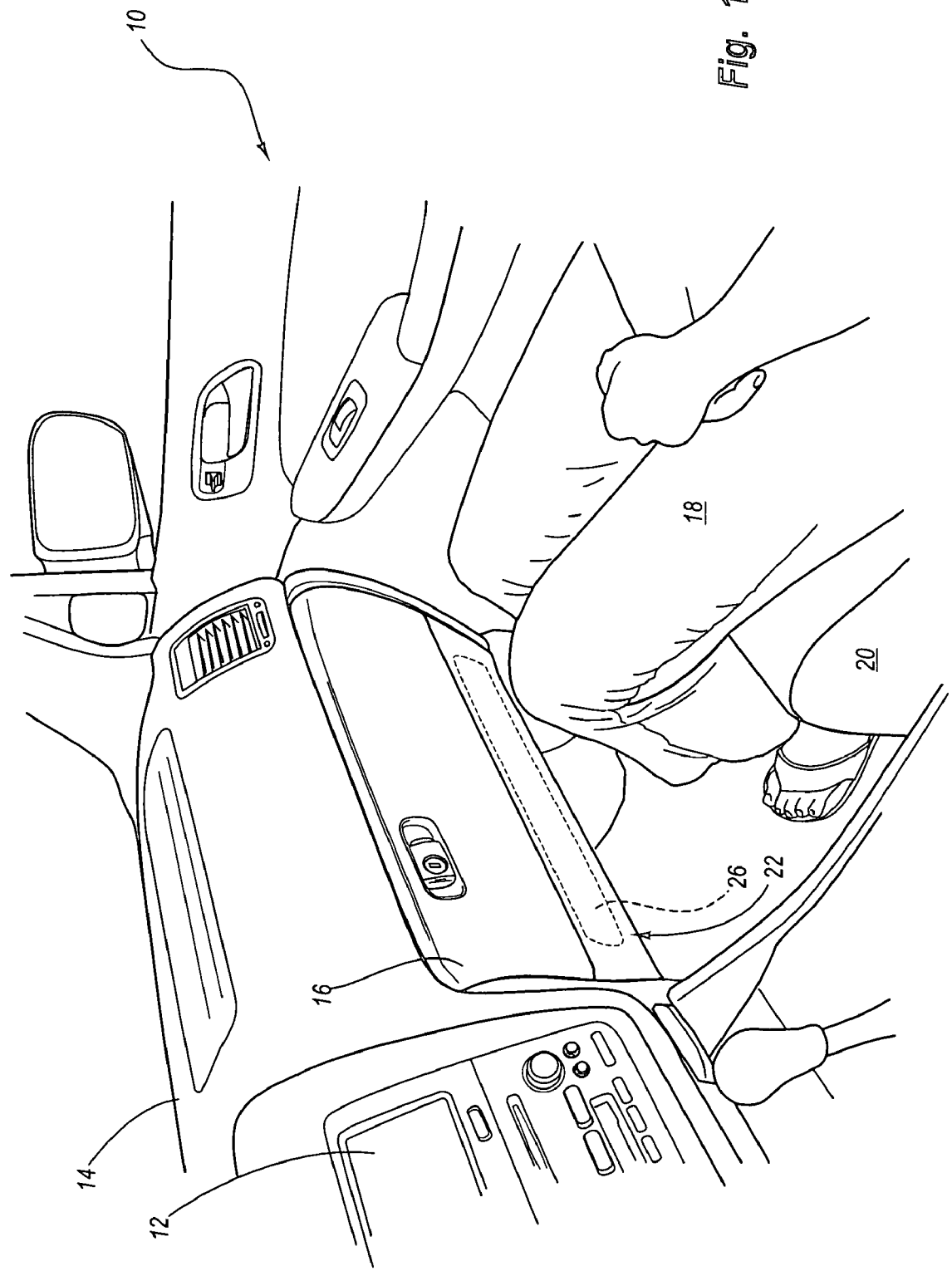
FIG. 1 is a perspective view of a vehicle interior that includes an airbag assembly according to the present invention.

Referring to FIG. 1, a perspective view of the passenger side of a vehicle interior 10 is illustrated. The vehicle interior 10 includes an instrument panel 12 and a dashboard 14. The instrument panel 12 and the dashboard 14 are positioned forwards of a front passenger seat 20. In FIG. 1, a vehicle occupant 18 is also illustrated seated on a front passenger seat 20.

An airbag assembly 22 according to the present invention is also added to the vehicle interior 10. The airbag assembly 22 comprises a glove box 16 and a housing 26 that is positioned below the glove box 16. Preferably, the housing 26 and the glove box 16 are attached to the instrument panel 12. Of course, other embodiments may be made in which the housing 26 is positioned proximate to the glove box 16. Yet further embodiments may be constructed in which the housing 26 is positioned in front of the glove box 16.

Figure 2:
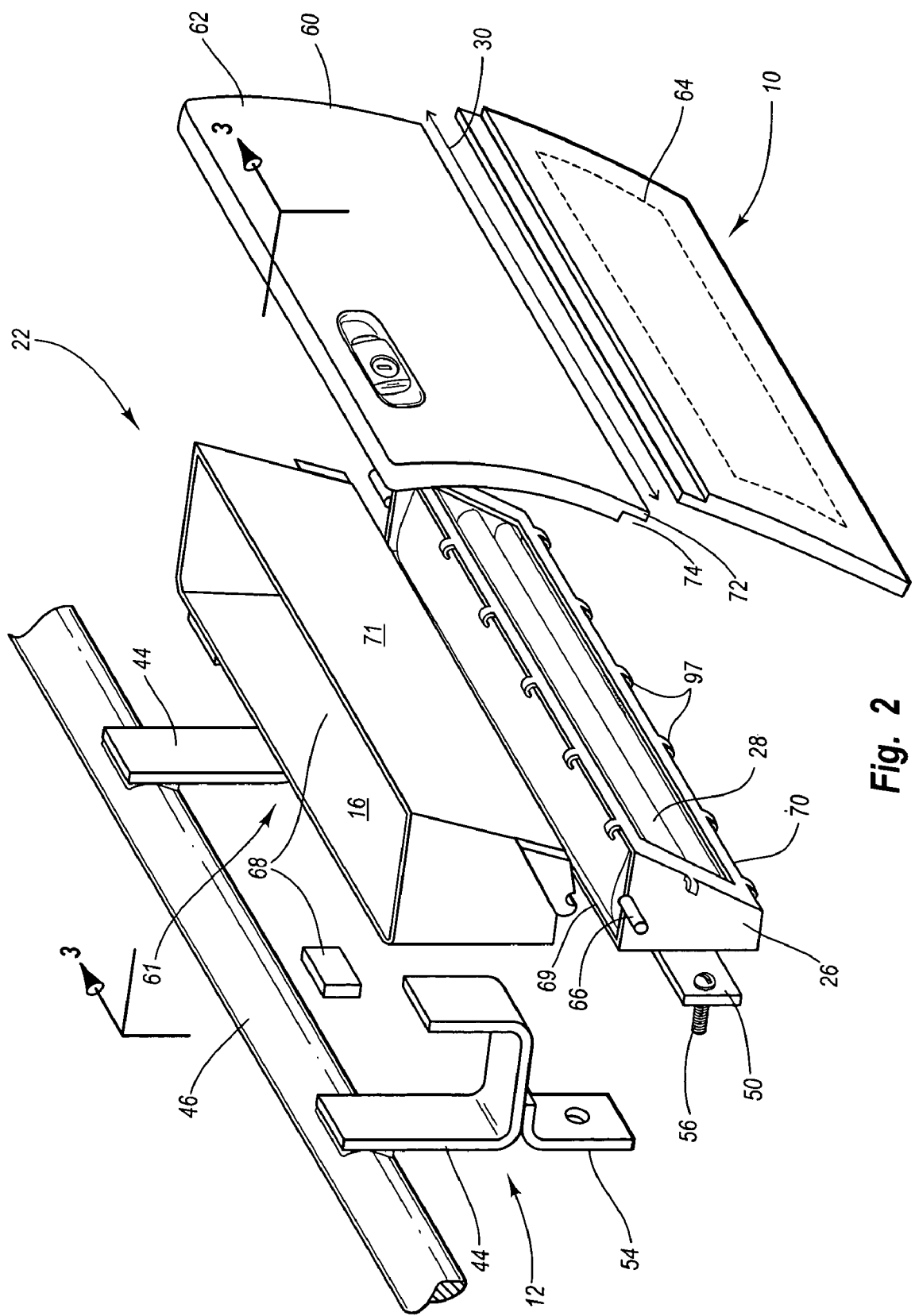
FIG. 2 is an assembly view of the airbag assembly shown in FIG. 1.

Referring now to FIG. 2, an assembly view of the airbag assembly 22 of FIG. 1 is illustrated. The airbag assembly 22 includes the glove box 16 that may be made polyvinyl, plastic, metal, combinations of polyvinyl, plastic or metal, and/or of other similar materials. The glove box 16 is constructed such that it is capable of storing papers, equipment, booklets, and other likely occupant belongings.

In the embodiment shown in FIG. 2, the glove box 16 is attached to the vehicle's instrument panel 12 via one or more U-brackets 44. More specifically, the glove box 16 is hingedly attached to top of the housing 26 and the housing 26 in turn attached to the U-brackets 44. The U-brackets 44 are then attached to a vehicle crossbeam 46 that is positioned on the instrument panel 12. However, other embodiments may also be made in which the glove box 16 is attached to the instrument panel 12 and/or the brackets 44 via welding, fasteners, and/or other similar methods.

As noted above, the airbag assembly 22 also includes the housing 26. The housing 26 is made of metal, polyvinyl, plastic, and the like and is designed to encase or enclose a knee airbag 28. Preferably, the housing 26 is positioned below the glove box 16. In fact, in the embodiment shown in FIG. 2, the entirety of the housing 26 is positioned below the entirety of the glove box 16. However, other embodiments may also be made in which only a portion of the housing 26 is positioned below the glove box 16.

In the embodiment shown in FIG. 2, the housing 26 is separate from the glove box 16 and is designed such that the length of the housing 26 is substantially equal to the longitudinal length 30 of the glove box 16. Those of skill in the art will recognize that other embodiments may also be made in which the shape, structure, and/or configuration of the housing 26 differs from that which is shown in FIG. 2. For example, embodiments may be made in which the housing 26 is connected to and/or integral with the all or a portion of the glove box 16. Still further embodiments may be made in which the length of the housing 26 is larger or smaller than the longitudinal length 30 of the glove box 16. Yet additional embodiments may be constructed in which the housing 26 is made of the same material that is used to construct the glove box 16.

A mounting bracket 50 may also be attached to the housing 26. More than one mounting bracket 50 may also be used. The mounting bracket 50 is constructed to attach the housing 26 to the instrument panel 12. In the embodiment shown in FIG. 2, the bracket 50 connects the housing 26 to a receiving portion 54 that has been added to the U-bracket 44. This connection between the bracket 50 and the receiving portion 54 is preferably accomplished via one or more fasteners 56. Of course, welding and/or other methods for attaching the housing 26 to the brackets 44 and/or the instrument panel 12 may also be used.

Referring still to FIG. 2, the airbag assembly 22 may further comprise a front member 60. The front member 60 is made of polyvinyl, thermoplastic, and the like and is positioned forward of the glove box 16. Preferably, the front member 60 covers both the glove box 16 and the housing 26.

In the embodiment shown in FIG. 2, the front member 60 comprises a glove box door 62 and an airbag door 64. The glove box door 62 covers the glove box 16. The glove box door 62 is attached to the front panel 71 of the glove box 16 whereas the airbag door 64 covers the housing 26. However, this depiction in FIG. 2 should not be interpreted as being limiting. Other embodiments may also be made in which the front member 60 is a glove box door 62 that covers both the glove box 16 and the housing 26.

A hinge 66 and/or a latch mechanism 68 may additionally be added to the airbag assembly 22. The latch mechanism 68 is attached to the front member 60 and is designed to selectively engage and disengage a top portion 61 of the instrument panel 12. Preferably, the hinge 66 and the latch mechanism 68 are designed such that if the latch mechanism 68 disengages from the top portion 61, the glove box door 62 may be opened (see FIG. 4). When the latch mechanism 68 disengages from the top portion 61, the glove box 16 and the glove box door 62 pivot about the hinge 66. More specifically, the hinge 66 is configured such that when the latch mechanism 68 disengages from the top portion 61, the glove box 16 and the glove box door 62 pivot about the hinge 6 toward the vehicle occupant so that the vehicle occupant may access the interior of the glove box 16.

As illustrated in the embodiment shown in FIG. 2, the hinge 66 is attached to a top edge 69 the housing 26. Of course, other embodiments may also be made in which the position of the hinge 66 differs from that which is depicted in FIG. 2. For example, some embodiments may be made in which the hinge 66 is positioned below or proximate to the bottom edge 70 the housing 26. Yet additional embodiments may embodiments may also be made in which the hinge 66 forms part of the vehicle's instrument panel 12. Additionally, one or more hooks 97 may also be added to the housing 26 to facilitate attachment of the airbag door 64.

Figure 3:
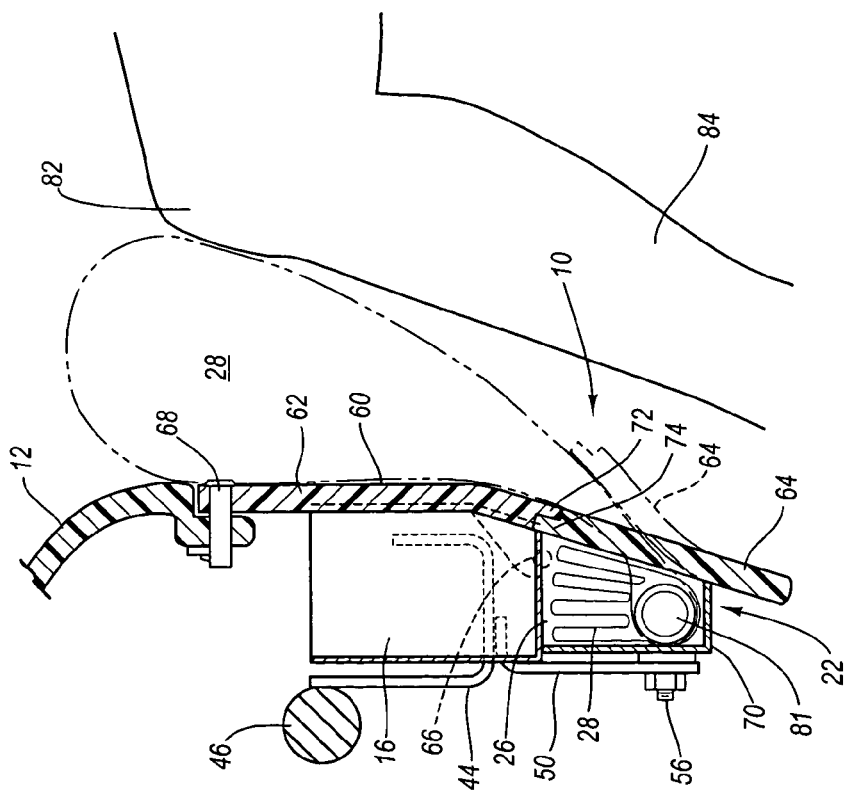
FIG. 3 is a side cross-sectional view of the airbag assembly of FIG. 2 in which the glove box door is shown in a closed position.

FIG. 3 is a side cross-sectional view taken along the line 3—3 of FIG. 2 in which the airbag assembly 22 of FIG. 2 has been installed onto the vehicle interior 10. As illustrated in FIG. 3, the glove box door 62 is in a "closed" position. More specifically, FIG. 3 illustrates the airbag assembly 22 in which the latch mechanism 68 engages a top portion 61 and holds the glove box door 62 adjacent to the instrument panel 12.

As seen in FIG. 3, the front member 60 may further be constructed such that the front bottom portion 72 of the glove box door 62 interlocks and/or fits together with the front top portion 74 of the airbag door 64. In some embodiments, this interlocking of the bottom portion 72 with the top portion 74 may be preferable in that it increases the visual appearance of the front member 60 by minimizing and/or reducing the gap between the glove box door 62 and the airbag door 64.

As depicted in FIG. 3, the knee airbag 28 has a stowed configuration and an inflated configuration (shown in phantom lines). In the event of a crash or accident, an ECU (not shown) detects the crash and/or triggers an inflator 81 to begin the inflating the knee airbag 28. Specifically, the ECU activates the inflator 81 such that the inflator 81 produces and/or channels a large volume of inflation gas (not shown) into the airbag 28. This influx of inflation gas converts the airbag 28 into the inflated configuration. As the airbag 28 inflates, the airbag 28 pushes and/or moves the airbag door 64 away from the glove box door 62 (as illustrated in phantom lines). Once the airbag door 64 has been sufficiently moved, the airbag 28 deploys substantially upwards such that it may contact or protect the occupants' knees 82 and/or legs 84 during a crash.

Figure 4:
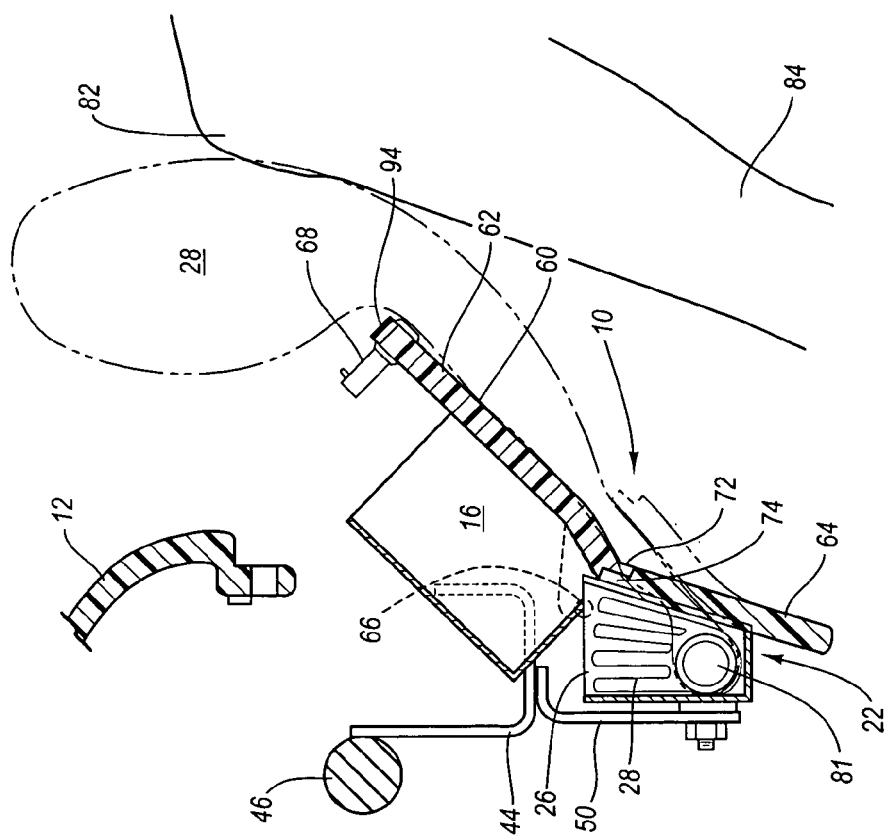
FIG. 4 is a side cross-sectional view of the airbag assembly of FIG. 2 in which the glove box door is shown in an open position.

FIG. 4 is a side cross-sectional view of the airbag assembly 22 that is similar to the view shown in FIG. 3. However unlike FIG. 3, the glove box door 62 in FIG. 4 is shown in an "open" position. Such opening of the glove box door 62 may be accomplished by disengaging the latch mechanism 68 from the top portion 61. Preferably, the hinge 66 and the U-brackets 44 are designed such that when the latch mechanism 68 disengages from the top portion 61, the hinge 66 and the U-brackets 44 open the glove box door 62 by having a top portion 94 of the glove box door 62 move outwardly away from the instrument panel 12. As can be seen in FIG. 4, the airbag assembly 22 is constructed such that the movement of the glove box door 62 into the open position does not move or affect the position of the housing 22.

The fact that the glove box door 62 may be in an open position during a crash does not block or hinder the deployment of the airbag 28 into the inflated configuration (shown in phantom lines). Rather, the airbag assembly 22 is constructed to deploy the airbag 28 into an inflated configuration regardless of whether the glove box door 62 is in an open position or a closed position. Additional embodiments may also be made in which the airbag assembly 22 is constructed such that if the glove box door 62 is in an open position during a crash, the deployment of the airbag 28 will push and/or move the glove box door 62 into a closed position.

Figure 5:
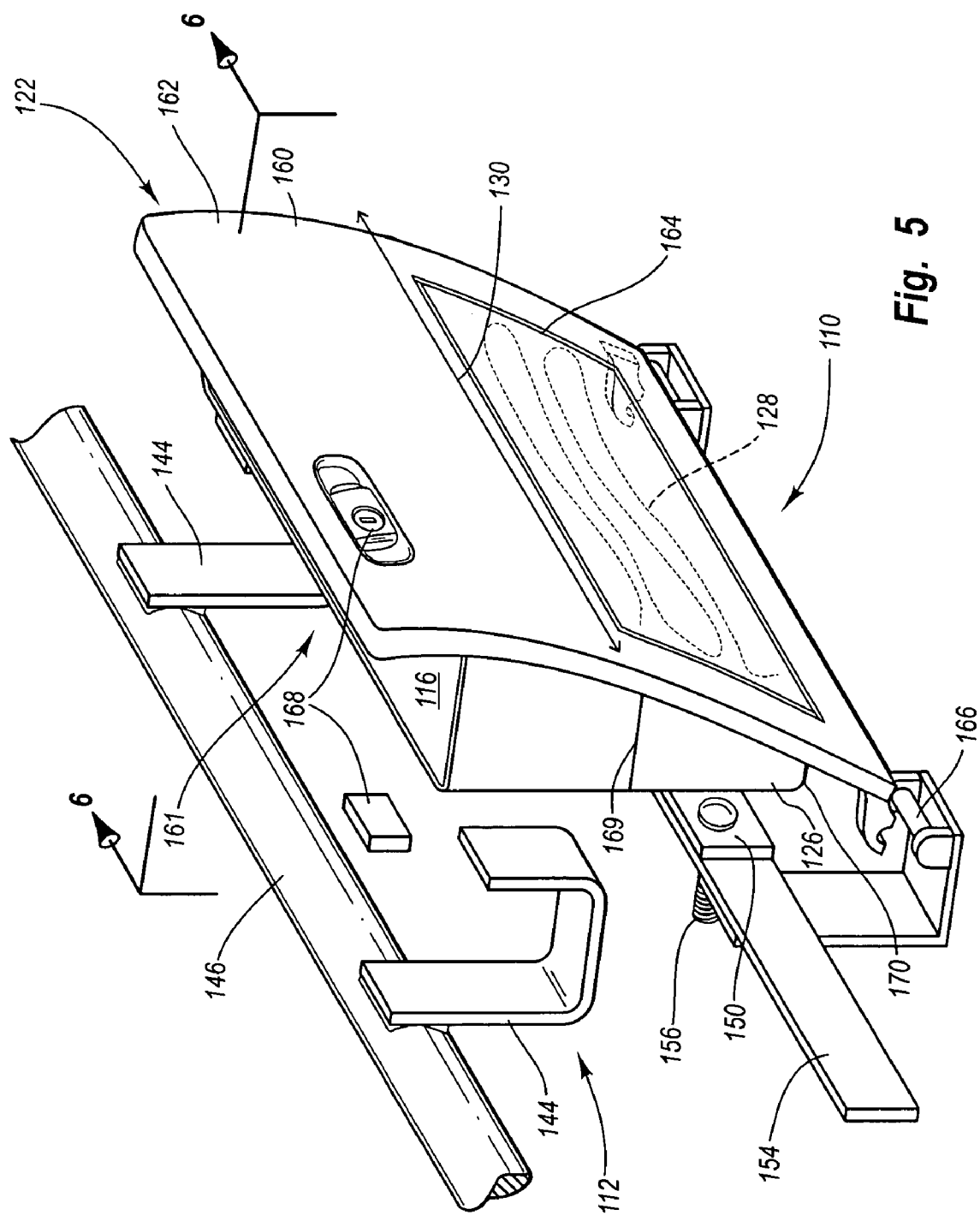
FIG. 5 is an assembly view of a further embodiment of an airbag assembly of the present invention.

Referring now to FIG. 5, a further embodiment of the present invention is illustrated. FIG. 5 is an assembly view of an airbag assembly 122 that may be installed onto a vehicle interior 110. As can be seen in FIG. 5, most of the components and elements of airbag assembly 122 are similar and/or equivalent to the components and elements that are found the embodiment shown in FIGS. 1 through 4.

The airbag assembly 122 includes a glove box 116 that may be used to store equipment, booklets, papers, and the like. The glove box 116 is constructed such that it may be attached to a vehicle's instrument panel 112. As with the previous embodiment, such attachment to the instrument panel 112 is preferably accomplished via one or more U-brackets 144. In turn, the U-brackets 144 are attached to a vehicle crossbeam 146 that is positioned on the instrument panel 112. However, welding and/or other methods of attaching the glove box 116 to the instrument panel 112 and/or the U-brackets 144 may also be used.

The airbag assembly 122 also includes a housing 126 that encases a knee airbag 128. The housing 126 is positioned below the glove box 116. As with the previous embodiment, the airbag assembly 122 is a separate component that is constructed such that the entirety of the housing 126 is positioned below the entirety of the glove box 116. However, other embodiments may also be made in which only of portion of the housing 126 is positioned below the glove box 116. Still further embodiments may be made in which the housing 126 is connected to and/or integral with the all or a portion of the glove box 116. Yet additional embodiments may be constructed in which the housing 126 is made of the same material that is used to construct the glove box 116.

Unlike the embodiment described above, the length of the housing 126 is not equal to the longitudinal length 130 of the glove box 116. Rather, in the embodiment shown in FIG. 5, the length of the housing 126 is smaller than the longitudinal length 130 of the glove box 116.

A mounting bracket 150 may also be attached to the housing 126. More than one mounting bracket 150 may also be used. The mounting bracket 150 is designed to attach the housing 126 to the instrument panel 112. The bracket 150 shown in FIG. 5 is constructed such that one or more fasteners 156 may secure the housing 126 to a beam 154 that is positioned on the instrument panel 112. However, other methods of connecting the housing 126 to the instrument panel 112 may also be used. Yet further embodiments may also be made in which the housing 126 is attached to the U-brackets 144 and/or other portions of the airbag assembly 122.

Referring still to FIG. 5, the airbag assembly 122 further comprises a front member 160. The front member 160 is positioned forward of the glove box 116 and covers both the glove box 116 and the housing 126. The front member 160 includes a glove box door 162 and an airbag door 164. The glove box door 162 covers the glove box 116 whereas the airbag door 164 covers the housing 126.

A hinge 166 and/or a latch mechanism 168 may additionally be added to the airbag assembly 122. The latch mechanism 168 is attached to the front member 160 and is designed to selectively engage and disengage a top portion 161 of the instrument panel 112. Preferably, the hinge 166 and the latch mechanism 168 are designed such that if the latch mechanism 168 disengages from the top portion 161, the glove box door 162 may be opened (see FIG. 7). When the latch mechanism 168 disengages from the top portion 61, the glove box 116 and the front member 160 pivot about the hinge 166. More specifically, the hinge 166 is configured such that when the latch mechanism 168 disengages from the top portion 161, the glove box 116 and the front member 160 pivot about the hinge 6 toward the vehicle occupant so that the vehicle occupant may access the interior of the glove box 116.

Unlike the embodiment described above, the hinge 166 is not attached to a top edge 169 of the housing 126. Rather, the hinge 166 is positioned below the housing 126. More specifically, the hinge 166 is positioned below a bottom edge 170 of the housing 126 and is attached to the instrument panel 112. In some embodiments, the hinge 166 is also coupled to a portion of the beam 154.

FIG. 6 is a side cross-sectional view taken along the line 6—6 in FIG. 5. As illustrated in FIG. 6, the glove box door 162 is in a "closed" position. More specifically, FIG. 6 illustrates the airbag assembly 122 in which the latch mechanism 168 engages the top portion 161 and holds the glove box door 162 adjacent to the instrument panel 112.

As depicted in FIG. 6, the knee airbag 128 has a stowed configuration and an inflated configuration (shown in phantom lines). In the event of a crash or accident, an ECU (not shown) detects the crash and/or triggers an inflator 181 to begin the inflating the knee airbag 128. Specifically, the ECU activates the inflator 181 such that the inflator 181 produces and/or channels a large volume of inflation gas (not shown) into the airbag 128. This influx of inflation gas converts the airbag 128 into the inflated configuration. As the airbag 128 inflates, the airbag 128 pushes and/or moves the airbag door 164 away from the glove box door 162 (as illustrated in phantom lines). Once the airbag door 164 has been sufficiently moved, the airbag 128 deploys substantially upwards such that it may contact or protect the occupants' knees 182 and/or legs 184 during a crash.

FIG. 7 is a side cross-sectional view of the airbag assembly 122 that is similar to the view shown in FIG. 6. However unlike FIG. 6, the glove box 162 in FIG. 7 is shown in an "open" position. Such opening of the glove box door 162 may be accomplished by disengaging the latch mechanism 168 from the top portion 161. Preferably, the hinge 166 and the U-brackets 144 are designed such that when the latch mechanism 168 disengages from the top portion 161, the hinge 166 and the U-brackets 144 open the glove box door 162 by having a top portion 194 of the glove box door 162 move outwardly away from the instrument panel 112. As can be seen in FIG. 7, the airbag assembly 122 is constructed such that the movement of the glove box door 162 into the open position likewise moves or changes the position of the housing 126. Furthermore, as seen in FIG. 7, the hinge 166 may be coupled to a portion of the beam 154.

The airbag assembly 122 may further be constructed such that when the glove box door 162 is in the open position, portions of the glove box door 162 and/or the glove box 116 become positioned in front of the airbag door 164. Accordingly, if a crash or accident occurs when the glove box door 162 is in the open position, such positioning of the glove box door 162 and/or the glove box 116 may block or hinder the deployment of the airbag 128 during a crash.

Figure 8:
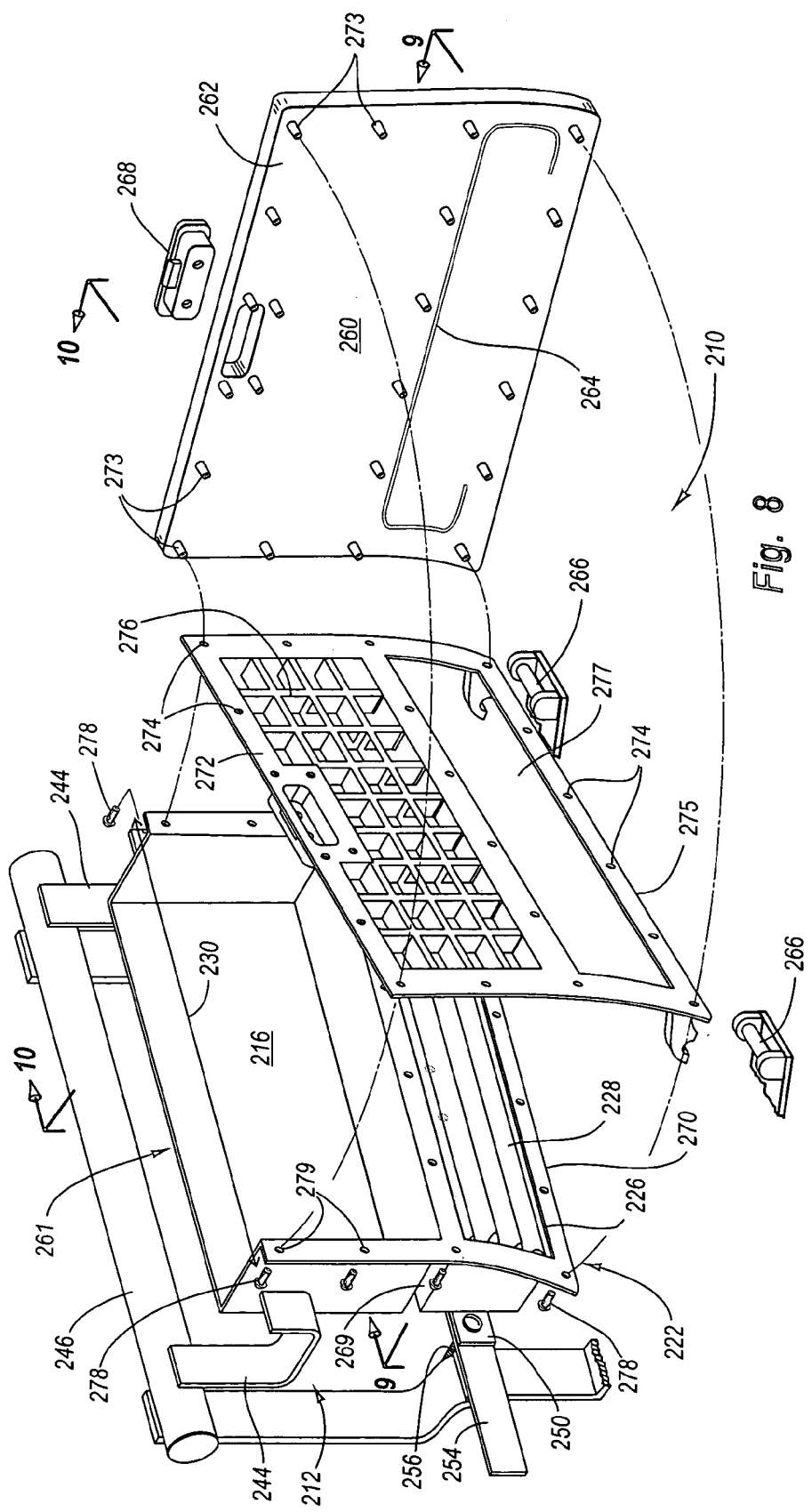
FIG. 8 is an assembly view of an additional embodiment of an airbag assembly of the present invention.

Referring now to FIG. 8, an additional embodiment of the present invention is illustrated. FIG. 8 is an assembly view of an airbag assembly 222 that may be installed or attached to a vehicle interior 210. As can be seen in FIG. 8, most of the components and elements of airbag assembly 222 are similar and/or equivalent to the components and elements that are found the embodiments described in conjunction with FIGS. 1 through 7.

The airbag assembly 222 includes a glove box 216 that may be used to store equipment, booklets, papers, and the like. The glove box 216 is constructed of metal, plastic (such as polypropylene and the like), polyvinyl, or other similar materials. Preferably, the glove box 216 is constructed such that it may be attached to a vehicle's instrument panel 212. As with the previous embodiment, such attachment to the instrument panel 212 is preferably accomplished via one or more U-brackets 244 that are mounted to a crossbeam 246 positioned on the instrument panel 212. However, welding and/or other methods for attaching the glove box 216 to the instrument panel 212 and/or U-brackets 244 may also be used.

The airbag assembly 222 also includes a housing 226 that encases a knee airbag 228. The housing 226 is positioned below the glove box 216 and may be made of metal, plastic (such as polypropylene and the like), polyvinyl, or other similar materials. As with the previous embodiments, the housing 226 is sized such that the length of the housing 226 is substantially equal to the longitudinal length 230 of the glove box 216. Additionally, the housing 226 is further constructed such that the entirety of the housing 226 is positioned below the entirety of the glove box 216. However, those of skill in the art will recognize that such features are not limiting. Other embodiments may also be made in which the length of the housing 226 is larger or smaller than the longitudinal length 230 of the glove box 216. Yet further embodiments may be made in which only a portion of the housing 226 is positioned below the glove box 216.

The airbag assembly 222 is further constructed such that the housing 226 is integral with the glove box 216. However as noted above, other embodiments may also be made in which the housing 216 and the housing 226 comprise two separate components. Yet further embodiments may be constructed in which the housing 226 is attached to the housing 216 via fasteners, welding, or other similar methods.

A mounting bracket 250 may also be hingedly attached to the housing 226. More than one mounting bracket 250 may also be used. The mounting bracket 250 is designed to attach one or more hinges 266 to the instrument panel 212. As with the embodiment shown in FIG. 5, the bracket 250 shown in FIG. 8 is constructed such that one or more fasteners 256 may secure the hinges 266 to a beam 254 that is positioned on the instrument panel 212. As indicated, the beam 254 may also be attached to the crossbeam 246. Of course, other methods of hingedly connecting the housing 226 to the instrument panel 212 may also be used. For example, further embodiment may also be made in which the housing 226 is hingedly attached to other portions of the airbag assembly 222.

The airbag assembly 222 further comprises a front member 260. The front member 260 is positioned forward of the glove box 216 and covers both the glove box 216 and the housing 226. Unlike the embodiments described above however, the front member 260 comprises a glove box door 262 that covers both the glove box 216 and the housing 226. A tear seam 264 that is positioned in front of the housing 226 may also be added.

In the embodiment shown in FIG. 8, the front member 260 is constructed of a thermoplastic material. One such thermoplastic material that is commonly used in the airbag industry is Hymont, Multibase 9001. However, other types of thermoplastic materials may also be used. Yet further embodiments may also be constructed in which the front member 260 is made of elastomeric polymers, polyvinyl, polypropylene, or other similar materials.

A hinge 266 and/or a latch mechanism 268 may additionally be added to the airbag assembly 222. The latch mechanism 268 is attached to the front member 260 and is designed to selectively engage and disengage a top portion 261 of the instrument panel 212. Preferably, the hinge 266 and the latch mechanism 268 are designed such that if the latch mechanism 268 disengages from the top portion 261, the glove box door 262 may be opened (see FIG. 11). The hinge 266 is designed such that it may be coupled to the beam 254. Again, the hinge 266 is designed such that if the latch mechanism 268 disengages from the top portion 261, the glove box 216, the front member 260, and the housing 226 will all pivot about the hinge 266. Specifically, the hinge 266 is designed such that if the latch 268 is disengaged, the glove box 216, the front member 260, and the housing 226 will all pivot towards the occupant so that the occupant may access the interior of the glove box 216.

As with the embodiment shown in FIG. 5, the hinge 266 is not attached to a top edge 269 of the housing 226. Rather, the hinge 266 is positioned below the housing 226. More specifically, the hinge 266 is positioned below a bottom edge 270 of the housing 226 and is located on the instrument panel 212.

Referring still to FIG. 8, the airbag assembly 222 may further comprise a middle panel 272. The middle panel 272 is made of metal, plastic, or other similar materials and is designed such that it increases the rigidity of the airbag assembly 222. The middle panel 272 is positioned behind the front member 260. The middle panel 272 is positioned between the front member 260 and the glove box 216/housing 226. As will be described in greater detail below, the middle panel 272 is preferably held between the front member 260 and the glove box 216/housing 226 by having the front member 260 include one or more extending tabs 273 that pass through one or more slots 274 that are positioned along a peripheral region 275 of the middle panel 272.

The middle panel 272 may further include one or more ribs 276. The ribs 276 are positioned in front of the glove box 216 and are designed to provide additional stiffness to the middle panel 272 and/or the glove box 216. An aperture 277 that is positioned in front of the housing 226 may also be added to the middle panel 272.

Figure 9:
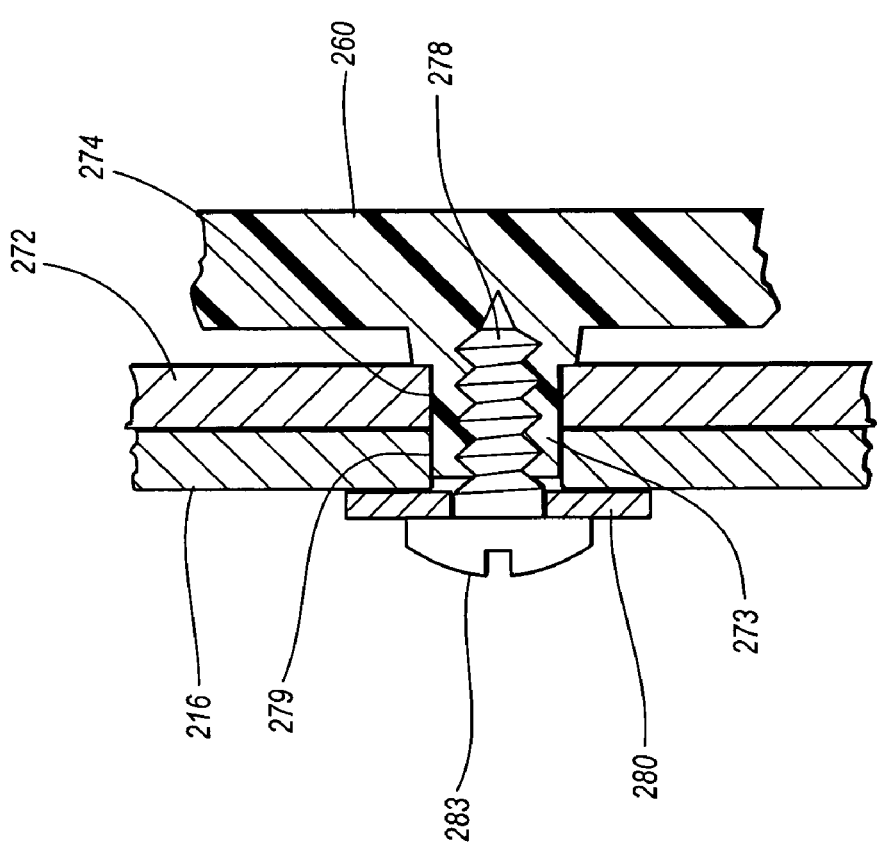
FIG. 9 is a side cross-sectional view of the embodiment of FIG. 8 that illustrates the way in which the middle panel of the airbag assembly may be attached to both the front member as well as the glove box/housing.

Referring now to FIG. 9, a cross-sectional view taken along the line 9—9 of FIG. 8 illustrates the way in which the extending tabs 273 may be used to hold the middle panel 272. More particularly, FIG. 9 shows the manner in which the extending tabs 273 may be used to hold the middle panel 272 between the glove box 216 and the front member 260. However, in an equivalent manner, the extending tabs 273 may also be used to hold the middle panel 272 between the housing 226 and the front member 260.

As illustrated in FIG. 9, the extending tabs 273 are constructed to engage the middle panel 272 by passing through the slots 274. Once the extending tabs 273 have passed through the slots 274, one or more fasteners 278 are then used to attach the extending tabs 273 to the glove box 216. Specifically, the fasteners 278 pass through an opening 279 in the glove box 216 and then engage a portion of the extending tabs 273.

In the embodiment shown in FIG. 9, the fasteners 278 comprise a washer 280 and a screw 283. Those of skill in the art will recognize that a variety of other types of structures or features may also be used as the fasteners 278. For example, other embodiments may also be made in which the fasteners 278 comprise nails, bolts, rivets, hook, and the like, including ultrasonic welding of thermoplastic materials.

The embodiment shown in FIG. 9 is further designed such that when the fasteners 278 are passed through the opening 279, a gap 279a is formed between the edge of the washer 280 and the edge of the extending tabs 273. Of course, other embodiments may also be designed such that when the fasteners 278 are passed through the opening 279, there is no gap between the edge of the washer 280 and the edge of the extending tabs 273.

FIG. 10 is a side cross-sectional view taken along the line 10—10 of FIG. 8. As illustrated in FIG. 10, the glove box door 262 is in a "closed" position. More specifically, FIG. 10 illustrates the airbag assembly 222 in which the latch mechanism 268 engages the top portion 261 and holds the glove box door 262 adjacent to the instrument panel 212.

As depicted in FIG. 10, the knee airbag 228 has a stowed configuration and an inflated configuration (shown in phantom lines). In the event of a crash or accident, an ECU (not shown) detects the crash and/or triggers an inflator 281 to begin the inflating the knee airbag 228. Specifically, the ECU activates the inflator 281 such that the inflator 281 produces and/or channels a large volume of inflation gas (not shown) into the airbag 228. This influx of inflation gas converts the airbag 128 into the inflated configuration. As the airbag 228 inflates, the airbag 228 moves through the aperture 277 (shown in FIG. 8) and then deploys into the vehicle interior 210 by tearing through the tear seam 264. Preferably, the airbag 228 deploys substantially upwards such that it may contact or protect the occupants' knees 282 and/or legs 284 during a crash.

FIG. 11 is a side cross-sectional view of the airbag assembly 222 that is similar to the view shown in FIG. 10. However, unlike FIG. 10, the glove box door 262 shown in FIG. 11 is in an "open" position. Such opening of the glove box door 262 may be accomplished by disengaging the latch mechanism 268 from the top portion 261. Preferably, the hinge 266 and the U-brackets 244 are designed such that when the latch mechanism 268 disengages from the top portion 261, the hinge 266 and the U-brackets 244 open the glove box door 262 by having a top portion 294 of the glove box door 262 move outwardly away from the instrument panel 112. As can be seen in FIG. 11, the airbag assembly 222 is constructed such that the movement of the glove box door 262 into the open position likewise moves and/or changes the position of the housing 226.

The fact that the glove box door 262 may be in an open position during a crash does not block or hinder the deployment of the airbag 228 into the inflated configuration (shown in phantom lines). Rather, the airbag assembly 222 is constructed to deploy the airbag 228 into an inflated configuration regardless of whether the glove box door 262 is in an open position or a closed position. Additionally, the airbag assembly 222 is further constructed such that if the glove box door 262 is in an open position during a crash, the deployment of the airbag 228 will push and/or move the glove box door 262 into a closed position (as illustrated by the arrow 296).

Figure 12:
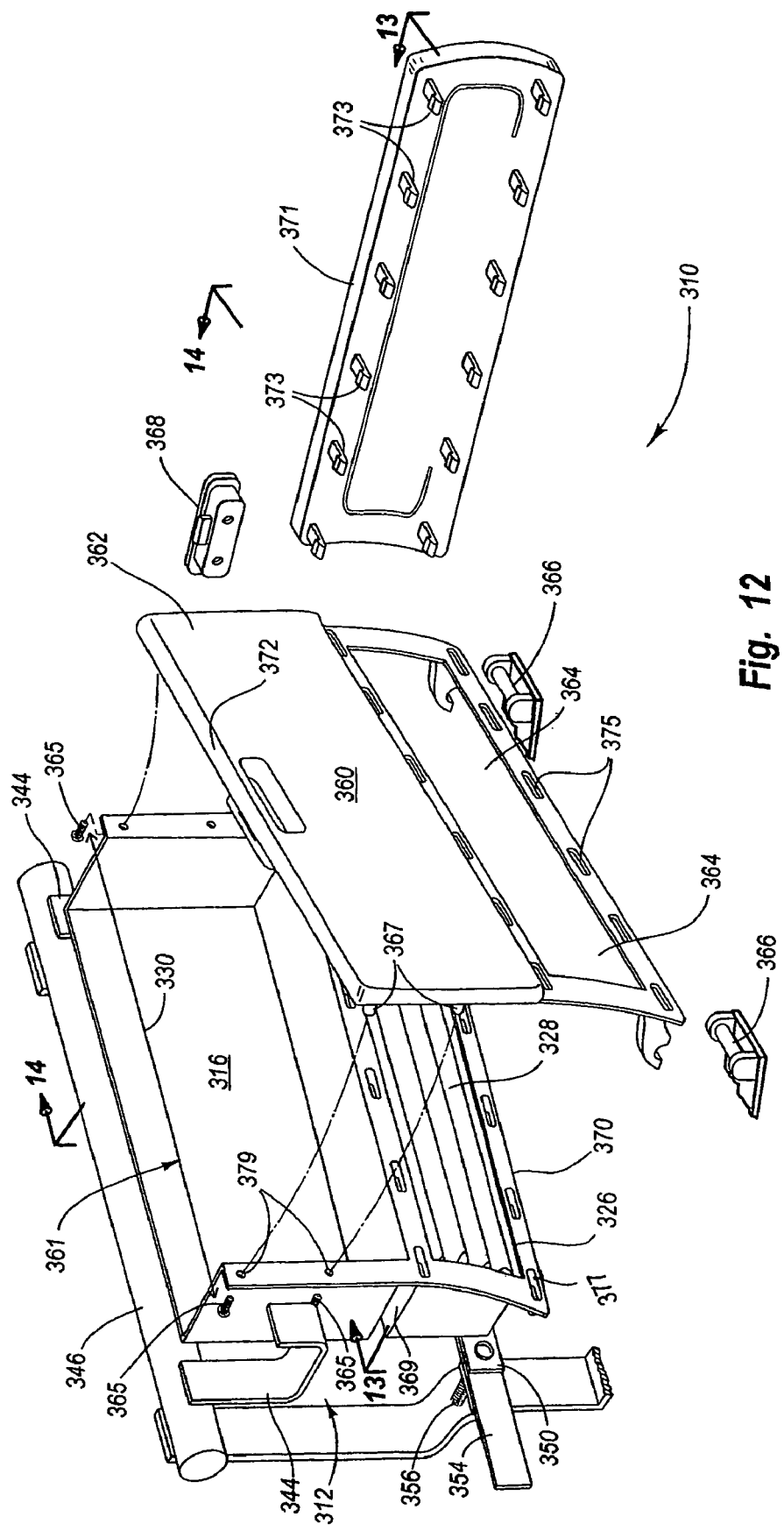
FIG. 12 is an assembly view of a yet further embodiment of an airbag assembly of the present invention.

Referring now to FIG. 12, a yet additional embodiment of the present invention is illustrated. FIG. 12 is an assembly 322 that may be installed or attached to a vehicle interior 310. As can be seen in FIG. 12, most of the components and elements of airbag assembly 322 are similar and/or equivalent to the components and elements that are found the embodiments described in conjunction with FIGS. 1 through 11.

The airbag assembly 322 includes a glove box 316 that may be used to store equipment, booklets, papers, and the like. Preferably, the glove box 316 is constructed such that it may be attached to a vehicle's instrument panel 312. As with the previous embodiment, such attachment to the instrument panel 312 is preferably accomplished via one or more U-brackets 344 that are mounted to a crossbeam 346 positioned on the instrument panel 312. However, welding and/or other methods or mechanisms for attaching the glove box 316 to the instrument panel 312 and/or the brackets 344 may also be used.

The airbag assembly 322 also includes a housing 326 that encases a knee airbag 328. The housing 326 is positioned below the glove box 316. The airbag assembly 322 is further constructed such that the housing 326 is integral with the glove box 316. However as noted above, other embodiments may also be made in which the glove box 316 and the housing 326 are two separate components. Yet further embodiments may be constructed in which the housing 326 is attached to the housing 316 via fasteners, welding, or other similar methods.

As with the previous embodiments, the housing 326 is sized such that the length of the housing 326 is substantially equal to the longitudinal length 330 of the glove box 316. Additionally, the housing 326 is further constructed such that the entirety of the housing 326 is positioned below the entirety of the glove box 316. However, those of skill in the art will recognize that such features are not limiting. Other embodiments may also be made in which the length of the housing 326 is larger or smaller than the longitudinal length 330 of the glove box 316. Yet further embodiments may be made in which only a portion of the housing 326 is positioned below the glove box 316.

A mounting bracket 350 may also be hingedly attached to the housing 326. More than one mounting bracket 350 may also be used. The mounting bracket 350 is designed to attach one or more hinges 366 to the instrument panel 312. As with the embodiments described in FIGS. 5 and 8, the bracket 350 shown in FIG. 12 is constructed such that one or more fasteners 356 may secure the hinges 366 to a beam 354 that is positioned on the instrument panel 312. As outlined above, other methods of hingedly connecting the housing 326 to the instrument panel 312 may also be used. Yet further embodiment may also be made in which the housing 326 is hingedly attached to the U-brackets 344 and/or other portions of the airbag assembly 322.

The airbag assembly 322 further comprises a front member 360. The front member 360 is positioned forward of the glove box 316 and covers both the glove box 316 and the housing 326. Unlike the embodiments described above however, the front member 360 includes both a glove box door 362 and an aperture 364. The glove box door 362 is positioned in front of the glove box 316 whereas the aperture 364 is positioned in front of the housing 326. Preferably, the glove box door 362 is attached to the glove box 316 via one or more fasteners 365 that engage protrusions 367 that extend rearwards from the glove box door 362. Specifically, the protrusion 367 and the fasteners 365 operate to attach the glove box door 362 in the same manner that the tabs 273 described in conjunction with FIG. 9 operate to attach the front member 260 to the glove box 216/housing 226 (see FIG. 9).

In the embodiment shown in FIG. 12, the front member 360, the glove box 316, and the housing 326 are all constructed of a less-expensive plastic material such as polypropylene. However, other materials may also be used. Specifically, embodiments may be made in which the front member 360, the glove box 316, and/or the housing 326 are made of metal, other types of plastic, rubber, polyvinyl, and the like.

A hinge 366 and/or a latch mechanism 368 may additionally be added to the airbag assembly 322. The latch mechanism 368 is attached to the front member 360 and is designed to selectively engage and disengage a top portion 361 of the instrument panel 312. Preferably, the hinge 366 and the latch mechanism 368 are designed such that if the latch mechanism 368 disengages from the top portion 361, the glove box door 362 may be opened (see FIG. 15).

As with the embodiments shown in FIGS. 5 and 8, the hinge 366 is not attached to a top edge 369 of the housing 326. Rather, the hinge 366 is positioned below the housing 326. More specifically, the hinge 366 is positioned below the bottom edge 370 of the housing 326 and is located on the instrument panel 312.

Referring still to FIG. 12, the airbag assembly 322 may further comprise a cover 371. The cover 371 is made of a thermoplastic elastomeric material and is sized and configured to cover the aperture 364. As will be described in greater detail below, the cover 371 is attached to the housing 326 and the front member 360 via one or more flanges 373 that engage holes 375 in the front member 360 and openings 377 in the housing 326.

Figure 13:
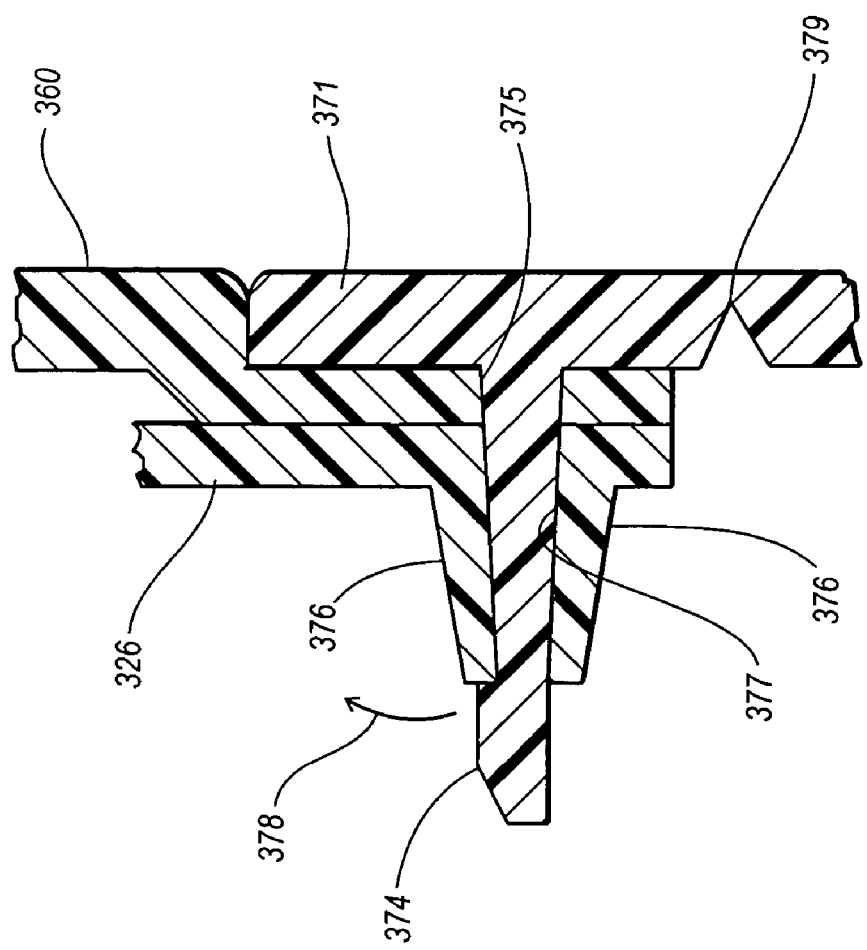
FIG. 13 is a side cross-sectional view of the embodiment of FIG. 12 that illustrates the way in which the cover of the airbag assembly may be attached to both the front member and the housing.

Referring now to FIG. 13, a cross-sectional view taken along the line 13—13 of FIG. 12 illustrates the way in which the flanges 373 operate to attach the cover 371. As illustrated in FIG. 13, the flanges comprise an enlarged end 374 and the housing 326 includes one or more engaging tanges 376 that surround and/or are positioned adjacent to the openings 377.

Once the flanges 373 have passed through the holes 375 in the front member 360, the end 374 contacts and/or engages the tanges 376. The contact between the tanges 376 and the end 374 causes the tanges 376 to flex or bend (as illustrated by the arrow 378). Such flexing of the tanges 376 allows the flanges 373 to pass through the openings 377 in the housing 326. However, once the flanges have been passed through the openings 377, the tanges 376 return to the normal position and engage the end 374. Such engagement between the end 374 and the tanges 376 holds the cover 371 in the proper position and ensures that the cover 371 is securely attached to the housing 326 and the front member 360.

Referring still to FIG. 13, the cover 371 may further include a tear seam 379. The tear seam 379 is a depression or weakness in the cover 371 that is designed such that during an crash or accident, the airbag 328 (shown in FIG. 12) may tear or deploy through the tear seam 379. As shown in FIG. 13, the tear seam 379 is positioned on the front panel 389 of the cover 371. However, other embodiments may also be made in which the tear seam 379 is added to the one or more of the tanges 376.

FIG. 14 is a side cross-sectional view taken along the line 14—14 of FIG. 12. As illustrated in FIG. 12, the glove box door 362 is in the "closed" position. More specifically, FIG. 14 illustrates the airbag assembly 322 in which the latch mechanism 368 engages the top portion 361 and holds the glove box door 362 adjacent to the instrument panel 312.

As depicted in FIG. 14, the knee airbag 328 has a stowed configuration and an inflated configuration (shown in phantom lines). In the event of a crash or accident, an ECU (not shown) detects the crash and/or triggers an inflator 381 to begin inflating the airbag 328. Specifically, the ECU activates the inflator 381 such that the inflator 381 produces and/or channels a large volume of inflation gas (not shown) into the airbag 328. This influx of inflation gas converts the airbag 328 into the inflated configuration. As the airbag 328 inflates, the airbag moves through the aperture 364 (shown in FIG. 12) and then deploys into the vehicle interior 310 by tearing through the tear seam 379. Preferably, the airbag 328 deploys substantially upwards such that it may contact or protect the occupants' knees 382 and/or legs 384 during a crash.

FIG. 15 is a side cross-sectional view of the airbag assembly 322 that is similar to the view shown in FIG. 14. However, unlike FIG. 14, the glove box door 362 shown in FIG. 15 is in the "open" position. Such opening of the glove box door 362 may be accomplished by disengaging the latch mechanism 368 from the top portion 361. Preferably, the hinge 366 is designed such that when the latch mechanism 368 disengages from the top portion 361, the hinge 366 opens the glove box door 363 by having a top portion 394 of the door 362 move outwardly away from the instrument panel 312. As seen in FIG. 15, the airbag assembly 322 is constructed such that the movement of the glove box door 362 into the open position will also move the housing 326.

The fact that the glove box door 362 may be in the open position during a crash does not block or hinder the deployment of the airbag 328 into the inflated configuration (shown in phantom lines). Rather, the airbag assembly 322 is constructed to deploy of the airbag 328 into the inflated configuration regardless of whether the glove box door 362 is in an open position or a closed position. Additionally, the airbag assembly 322 is further constructed such that if the glove box door 362 is in an open position during a crash, the deployment of the airbag 328 will push and/or return the glove box door 362 into a closed position (as illustrated by the arrow 396).

In summary, the present invention provides a novel glove box airbag assemblies that include a glove box, a housing, and front member. These glove box airbag assemblies have been specifically designed to overcome many of the limitations and drawbacks associated with previously known glove box airbag systems.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An airbag assembly comprising:
    a glove box;
    a knee airbag;
    a housing encasing the knee airbag, the housing being positioned proximate the glove box; and
    a front member that covers the glove box and the housing, wherein the front member does not displace toward the vehicle interior during deployment, and wherein the airbag assembly is constructed such that during a crash, the airbag will deploy into an inflated configuration regardless of whether a glove box door is in an open position or a closed position.

2. An airbag assembly as in claim 1 wherein the front member comprises a glove box door that covers both the glove box and the housing.

3. An airbag assembly as in claim 1 wherein the assembly further comprises a hinge.

4. An airbag assembly as in claim 3 wherein the hinge is positioned on a vehicle's instrument panel below a bottom edge of the housing.

5. An airbag assembly as in claim 1 wherein the front member comprises a tear seam.

6. An airbag assembly as in claim 1 further comprising a latch mechanism that is attached to the front member.

7. An airbag assembly as in claim 1 wherein the housing is integral with the glove box.

8. An airbag assembly as in claim 1 wherein the assembly is constructed such that the knee airbag will deploy substantially upward when installed onto a vehicle.

9. An airbag assembly as in claim 1 wherein the assembly is constructed such that the housing will move when the glove box door is opened.

10. An airbag assembly as in claim 1 further comprising an inflator for deploying the knee airbag into an inflated configuration.

11. An airbag assembly as in claim 1 further comprising a mounting bracket attached to the housing.

12. An airbag assembly as in claim 1 wherein the front member comprises a glove box door and an aperture.

13. An airbag assembly as in claim 12 further comprising a cover sized and configured to cover the aperture.

14. An airbag assembly as in claim 13 wherein the cover includes one or more flanges.

15. An airbag assembly as in claim 14 wherein the flanges engage holes in the front member and openings in the housing.

16. An airbag assembly as in claim 14 wherein the flanges engage one or more engaging tanges that are positioned on the housing.

17. An airbag assembly as in claim 13 wherein the cover includes a tear seam that is positioned on a front panel of the cover.

18. An airbag assembly comprising:
    a glove box;
    a knee airbag;
    a housing encasing the knee airbag, wherein the entirety of the housing is positioned below the entirety of the glove box; and
    a front member that covers the glove box and the housing, wherein the front member comprises a glove box door and an aperture, further comprising a cover sized and configured to cover the aperture, wherein the cover includes one or more flanges.

19. An airbag assembly as in claim 18 wherein the front member comprises a glove box door that covers both the glove box and the housing.

20. An airbag assembly as in claim 18 further comprising a hinge that is positioned on a vehicle's instrument panel below a bottom edge of the housing.

21. An airbag assembly as in claim 18 wherein the front member comprises a tear seam.

22. An airbag assembly as in claim 18 wherein the housing is integral with the glove box.

23. An airbag assembly as in claim 18 wherein the flanges engage one or more engaging tanges positioned on the housing.

24. An airbag assembly as in claim 18 wherein the cover includes a tear seam.

25. An airbag assembly as in claim 18 wherein the airbag assembly is constructed such that during a crash, the airbag will deploy into an inflated configuration regardless of whether a glove box door is in an open position or a closed position.

26. An airbag assembly comprising:
   a glove box;
   a knee airbag;
   a housing that encases the knee airbag, the housing being positioned below the glove box; and
   a front member comprising a glove box door and aperture, the glove box door being positioned in front of the glove box and the aperture being positioned in front of the housing; and
   a cover positioned over the aperture, the cover being attached to the housing, wherein the front member does not displace toward the vehicle interior during deployment, and wherein the airbag assembly is constructed such that during a crash, the airbag will deploy into an inflated configuration regardless of whether a glove box door is in an open position or a closed position.

27. An airbag assembly as in claim 26 wherein the cover includes one or more flanges.

28. An airbag assembly as in claim 27 wherein the flanges are designed to engage holes in the front member and openings in the housing.

29. An airbag assembly as in claim 27 wherein the flanges engage one or more engaging tanges positioned on the housing.

30. An airbag assembly as in claim 26 wherein the cover includes a tear seam positioned on a front panel of the cover.

31. An airbag assembly as in claim 26 wherein the deployment of the airbag into an inflated configuration moves the glove box door into a closed position.

* * * * *